United States Patent
Wang et al.

(10) Patent No.: US 8,380,940 B2
(45) Date of Patent: Feb. 19, 2013

(54) MULTI-CHANNEL MULTI-PORT MEMORY

(75) Inventors: Feng Wang, San Diego, CA (US);
Shiqun Gu, San Diego, CA (US);
Matthew Michael Nowak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 12/823,515

(22) Filed: Jun. 25, 2010

(65) Prior Publication Data

US 2011/0320698 A1 Dec. 29, 2011

(51) Int. Cl.
*G06F 12/06* (2006.01)
(52) U.S. Cl. ............. 711/149; 711/5; 711/154; 711/170
(58) Field of Classification Search .............. 711/5, 149, 711/154, 170
See application file for complete search history.

(56) References Cited

U.S. PATENT DOCUMENTS

| | | |
|---|---|---|
| 5,450,355 A | 9/1995 | Hush |
| 5,504,876 A * | 4/1996 | Dougall et al. ............ 711/167 |
| 6,065,092 A | 5/2000 | Roy |
| 6,799,252 B1 * | 9/2004 | Bauman ........................ 711/149 |
| 7,089,379 B1 | 8/2006 | Sharma et al. |
| 7,769,942 B2 * | 8/2010 | Ware et al. ..................... 710/317 |
| 8,164,936 B2 * | 4/2012 | Feldman et al. ................. 365/63 |
| 2002/0075845 A1 * | 6/2002 | Mullaney et al. ............ 370/351 |
| 2008/0077747 A1 * | 3/2008 | Hur et al. ...................... 711/149 |
| 2009/0182914 A1 * | 7/2009 | Matsui ......................... 710/100 |
| 2009/0228638 A1 * | 9/2009 | Kwon .......................... 711/103 |
| 2009/0240897 A1 * | 9/2009 | Kajigaya ....................... 711/149 |
| 2009/0276545 A1 * | 11/2009 | Lee et al. ........................... 710/8 |

FOREIGN PATENT DOCUMENTS

WO WO2008014413 A2 1/2008

OTHER PUBLICATIONS

International Search Report and Written Opinion—PCT/US2011/041250—ISA/EPO—Oct. 11, 2011.

* cited by examiner

*Primary Examiner* — John Lane
(74) *Attorney, Agent, or Firm* — Sam Talpalatsky; Nicholas J. Pauley; Jonathan T. Velasco

(57) ABSTRACT

A multi-channel multi-port memory is disclosed. In a particular embodiment, the multi-channel memory includes a plurality of channels responsive to a plurality of memory controllers. The multi-channel memory may also include a first multi-port multi-bank structure accessible to a first set of the plurality of channels and a second multi-port multi-bank structure accessible to a second set of the plurality of channels.

46 Claims, 7 Drawing Sheets

Sequentially received data from memory controllers (not shown)

Fully shared memory banks

Sequentially received data from memory controllers (not shown)

Memory banks evenly allocated to different ports

Memory banks evenly allocated to different ports with interleaved data storage

Memory banks unevenly allocated

MULTI-CHANNEL MULTI-PORT MEMORY

I. FIELD

The present disclosure is generally related to memory devices and memory architectures.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Personal computing devices such as wireless computing devices often include memory such as double-data-rate (DDR) memory. DDR memory may be single-channel or multi-channel. Currently available multi-channel DDR memory typically includes a set of memory banks. The set of memory banks is divided into subsets, and each subset is accessible via a memory channel statically assigned to the subset. When the memory is inserted into an electronic device, each memory controller of the electronic device communicates with the memory via a single memory channel. Thus, a particular memory controller communicating via a particular memory channel may be limited to accessing only those memory banks that the particular memory channel is assigned to. That is, each memory channel of the DDR memory may act as an independent memory device consisting of a subset of the memory banks of the DDR memory. This arrangement may lead to memory bank conflicts when a particular memory channel is used repeatedly. This arrangement may also make load balancing across memory controllers difficult when certain memory banks are accessed more often than other memory banks.

III. SUMMARY

A multi-channel multi-port memory is disclosed that includes multiple multi-port multi-bank memory structures. The multi-channel multi-port memory enables access to a particular memory bank from more than one port and via more than one channel. The multi-channel multi-port memory also supports dynamic transition between allocation schemes (e.g., fully shared memory banks, even allocation of memory banks, uneven allocation of memory banks, and interleaved storage) to achieve particular levels of load balancing, throughput, and bandwidth.

In a particular embodiment, an apparatus is disclosed. The apparatus includes a plurality of channels responsive to a plurality of memory controllers. The apparatus also includes a first multi-port multi-bank structure accessible to a first set of the plurality of channels and a second multi-port multi-bank structure accessible to a second set of the plurality of channels.

In another particular embodiment, an apparatus is disclosed that includes a plurality of memory banks, a plurality of ports, and a plurality of channels. Each port is configured to exchange data with a memory controller. Each channel is configured to access each of the memory banks and to exchange data with each of the memory banks and each port.

In another particular embodiment, a method that includes accessing a first memory bank of a plurality of memory banks from a first port of a plurality of ports via a first channel of a plurality of channels. The method also includes accessing the first memory bank from the first port via a second channel of the plurality of channels. The method further includes accessing a second memory bank of the plurality of memory banks from a second port of the plurality of ports via the second channel. The method includes accessing the second memory bank from the second port via the first channel.

One particular advantage provided by at least one of the disclosed embodiments is that a particular memory bank is accessible to multiple memory controllers. Another particular advantage provided by at least one of the disclosed embodiments is that a memory bank can be accessed from multiple memory ports and via multiple memory channels.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
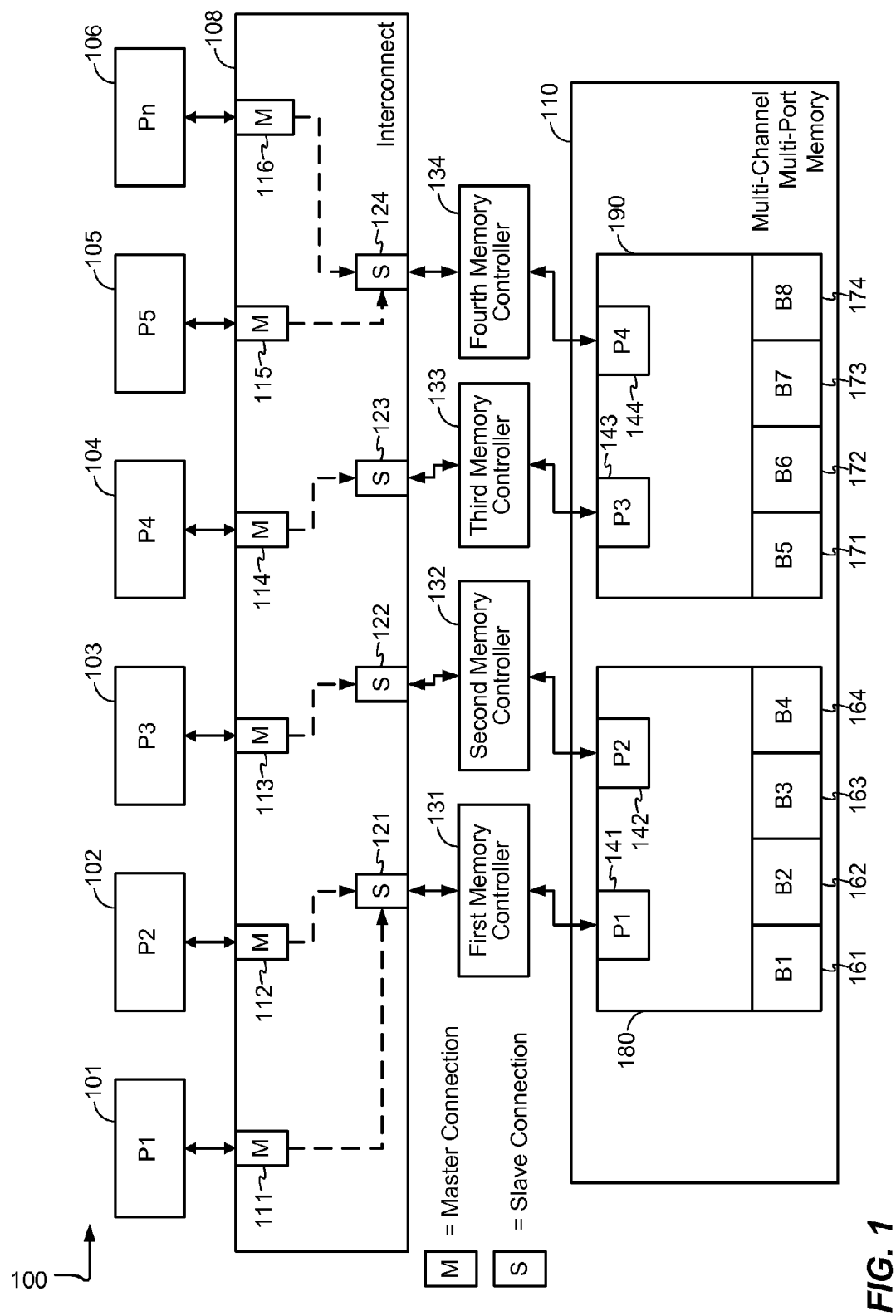
FIG. 1 is a block diagram of a particular embodiment of a memory access system including a multi-channel multi-port memory device.

Referring to the drawings in which like reference numbers indicate like elements, FIG. 1 depicts a particular embodiment of a memory access system 100. The memory access system 100 includes a plurality (e.g., n) of functional masters or computing subsystems, such as a first processor 101, a second processor 102, a third processor 103, a fourth processor 104, a fifth processor 105, and an nth processor 106. Each of the masters 101-106 is communicatively coupled to an interconnect 108 that is communicatively coupled to a plurality of memory controllers, such as a representative first memory controller 131, a second memory controller 132, a third memory controller 133, and a fourth memory controller 134. Each of the memory controllers 131-134 is communicatively coupled to a multi-channel multi-port memory 110. Each of the memory controllers 131-134 may be considered a channel, and each channel may be considered responsive to a memory controller. Generally, the memory access system 100 enables each of the masters 101-106 to retrieve data from and store data to the multi-channel multi-port memory 110.

The masters 101-106 may be responsible for performing various functionalities. For example, when the memory access system 100 is incorporated into a mobile device, the masters 101-106 may perform functionality such as multiplexed data processing, video processing, graphics processing, standard control processing, multiplexing/demultiplexing, and master control processing. It should be noted that these functionalities are for example only. The masters 101-106 may each perform any number of different functionalities.

The interconnect 108 facilitates access between the masters 101-106 and the memory controllers 131-134 to read data from and write data to the multi-channel multi-port memory 110. In a particular embodiment, the interconnect 108 facilitates access between the masters 101-106 and the memory controllers 131-134 via a network of master connections and slave connections. The interconnect 108 may include a master connection for each master of the system 100. For example, in the particular embodiment illustrated in FIG. 1, the first processor 101 has a corresponding first master connection 111, the second processor 102 has a corresponding second master connection 112, the third processor 103 has a corresponding third master connection 113, the fourth processor 104 has a corresponding fourth master connection 114, the fifth processor 105 has a corresponding fifth master connection 115, and the nth processor 106 has a corresponding nth master connection 116.

The interconnect 108 may also include a slave connection for each memory controller of the memory access system 100. For example, in the particular embodiment illustrated in FIG. 1, the first memory controller 131 has a corresponding first slave connection 121, the second memory controller 132 has a corresponding second slave connection 122, the third memory controller 133 has a corresponding third slave connection 123, and the fourth memory controller 134 has a corresponding fourth slave connection 124.

In a particular embodiment, the interconnect 108 can be dynamically switched so that any of the master connections 111-116 can be connected to any of the slave connections 121-124. The switching may be performed based on control bits or address bits included in data requests received from the masters 101-106.

The multi-channel multi-port memory 110 includes a plurality of multi-port multi-bank structures, such as a representative first multi-port multi-bank structure 180 and a second multi-port multi-bank structure 190. The multi-port multi-bank structures 180, 190 may be volatile memory devices or non-volatile memory devices. Examples of volatile memory devices include, but are not limited to, dynamic random access memory (DRAM), double data rate random access memory (DDRAM), stacked DDRAM, and Through Silicon Stacking stacked DDRAM (TSS Stacked DDRAM). Examples of non-volatile memory devices include, but are not limited to, magnetic random access memory (MRAM), programmable contact memory, flash memory, and phase change RAM.

Each memory controller in the memory access system 100 may be connected to a particular multi-port multi-bank structure via a memory port. For example, in the particular embodiment illustrated in FIG. 1, the first memory controller 131 is connected to the first multi-port multi-bank structure 180 via a first memory port 141, the second memory controller 132 is connected to the first multi-port multi-bank structure 180 via a second memory port 142, the third memory controller 133 is connected to the second multi-port multi-bank structure 190 via a third memory port 143, and the fourth memory controller is connected to the second multi-port multi-bank structure 190 via a fourth memory port 144.

Each of the multi-port multi-bank structures 180 and 190 includes a plurality of memory banks For example, in the particular embodiment illustrated in FIG. 1, the first multi-port multi-bank structure 180 includes a first memory bank 161, a second memory bank 162, a third memory bank 163, and a fourth memory bank 164. The second multi-port multi-bank structure 190 also includes four memory banks—a fifth memory bank 171, a sixth memory bank 172, a seventh memory bank 173, and an eighth memory bank 174. In a particular embodiment, a first subset of the plurality of memory banks is accessible to a first memory port and a second subset of the plurality of memory banks is accessible to a second memory port.

Each of the multi-port multi-bank structures 180 and 190 may be accessible via multiple memory channels, i.e., may be accessible to multiple memory controllers. For example, in the particular embodiment illustrated in FIG. 1, the memory banks 161-164 are accessible to both the first memory controller 131 and the second memory controller 132. Similarly, the memory banks 171-174 are accessible to both the third memory controller 133 and the fourth memory controller 134. It should be noted that although each of the multi-port multi-bank structures 180, 190 is illustrated in FIG. 1 as having two memory ports, multi-port multi-bank structures in the multi-channel multi-port memory 110 may instead have any number of memory ports and memory channels (i.e., memory controllers connected to the memory ports).

Although the controllers connected to a multi-port multi-bank structure may have access to each memory bank in the multi-port multi-bank structure, memory controllers may be granted access to only particular memory banks during operation of the memory access system 100. Such assignments between memory controllers and memory banks may be dynamically reconfigurable. For example, when the first memory bank 161 is accessed more often than the other memory banks 162-164 of the first multi-port multi-bank structure 180, the first memory controller 131 may be assigned to the first memory bank 161 and the second memory controller 132 may be assigned to the remaining memory banks 162-164. Thus, heavily used memory banks may be provided with a dedicated memory channel and memory controller to achieve load balancing across memory controllers. In a particular embodiment, dynamic memory channel configuration and multi-channeling may be achieved through the use of dedicated pins in an input/output (I/O) interface between the memory controllers 131-134 and the memory ports 141-144.

Because memory channels in the multi-channel multi-port memory 110 are dynamically reconfigurable, a particular memory bank may be accessed in a plurality of ways. For example, a data operation targeting the second memory bank 162 may be serviced in two different ways. The first memory controller 131 may access the second memory bank 162, or the second memory controller 132 may access the second memory bank 162. How each data operation is serviced may depend on the configuration of the memory controllers 131-132 at the time when the data operation is initiated.

In operation, the masters 101-106 may make data requests (e.g., read operations or write operations) via the master connections 111-116 corresponding to the masters 101-106. For example, the third processor 103 may desire to read a particular block of memory that has a logical address corresponding to a physical address located in the fourth memory bank 164. Based on the requested address(es), the interconnect 108 may connect the corresponding master connections 111-116 to one of the slave connections 121-124. For example, the interconnect 108 may connect the third master connection 113 corresponding to the third processor 103 to the first slave connection 121, since the first slave connection 121 is connected to the first memory controller 131 that has access to the fourth memory bank 164. Alternatively, the interconnect may connect the third master connection 113 to the second slave connection 122, since the second slave connection 122 is connected to the second memory controller 132 that also has access to the fourth memory bank 164.

It will be appreciated that the memory access system 100 of FIG. 1 may enable multiple memory controllers to share access to a particular memory bank. It will also be appreciated that the memory access system 100 of FIG. 1 may enable dynamic resizing of memory channels based on memory access patterns, which may increase effective throughput of the multi-channel multi-port memory 110. The flexible and dynamic nature of memory access provided by the memory access system 100 may also improve load balancing and memory bandwidth, so that some memory banks are not disproportionately used compared to other memory banks (e.g., when some masters have a higher memory demand than other masters).

Figure 2:
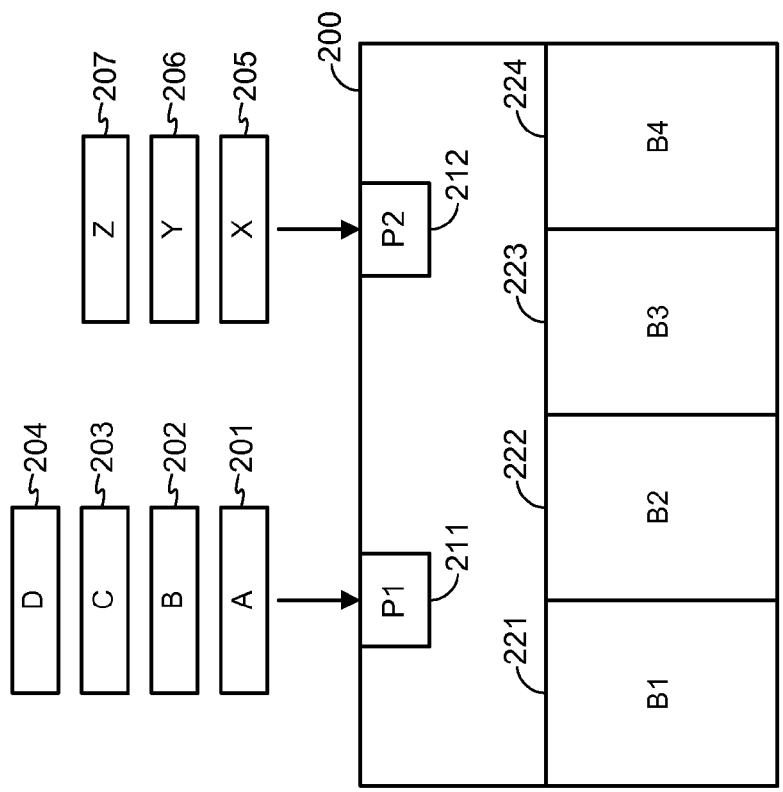
FIG. 2 is a diagram to illustrate an example of sequentially receiving data at a multi-channel multi-port memory device.

FIG. 2 is a diagram to illustrate an example of sequentially receiving data at a multi-channel multi-port memory device that includes a multi-port multi-bank structure 200. The multi-port multi-bank structure 200 includes a plurality of memory ports, such as a representative first memory port 211 and a second memory port 212, and a plurality of memory banks, such as a representative memory first memory bank 221, a second memory bank 222, a third memory bank 223, and a fourth memory bank 224. In an illustrative embodiment, the multi-port multi-bank structure 200 is one of the multi-port multi-bank structures 180, 190 of FIG. 1.

Each of the memory ports 211-212 of the multi-port multi-bank structure 200 may be coupled with a memory controller (not shown) and may receive data to be stored at the multi-port multi-bank structure 200 from the memory controller. For example, as illustrated in FIG. 2, the first memory port 211 receives four data packets to be stored at the multi-port multi-bank structure 200. Data packet A 201 is received prior to Data packet B 202. Data packet C 203 follows data packet B 202 and precedes data packet D 204.

The second memory port 212 receives three data packets to be stored at the multi-port multi-bank structure 200. Data packet X 205 is received first, followed by data packet Y 206 and finally data packet Z 207. Data packet X 205 is also received at the second memory port 212 before data packet B is received at the first memory port 211. Similarly, data packet Y 206 is received at the second memory port 212 before data packet C 203 is received at the first memory port 211, and data packet Z 207 is received at the second memory port 212 before data packet D 204 is received at the first memory port 211.

The multi-port multi-bank structure 200 may support various allocation methods, such as fully shared memory banks, evenly allocated memory banks, unevenly allocated memory banks, and interleaved data storage. Thus, where the data packets A-Z 201-207 are stored in the multi-port multi-bank structure 200 may depend on the particular allocation method in effect when the data packets A-Z 201-207 are received, as illustrated herein by FIGS. 3-6.

Figure 3:
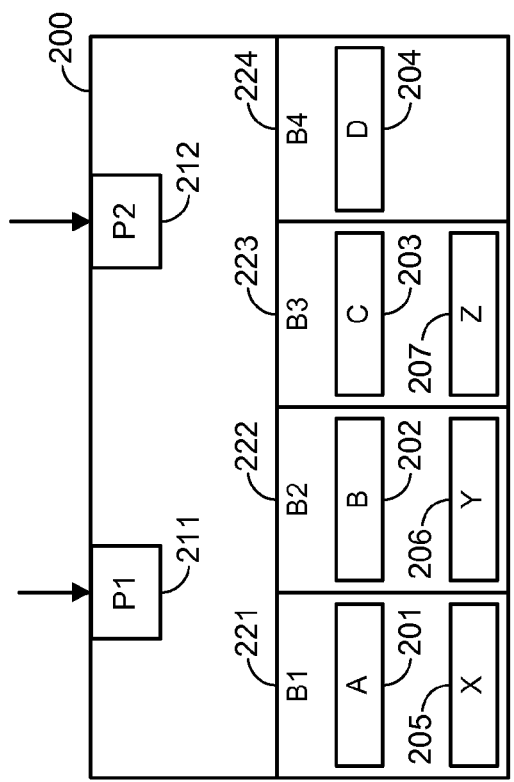
FIG. 3 is a diagram to illustrate a particular embodiment of data storage at a multi-channel multi-port memory device when memory banks are fully shared.

FIG. 3 is a diagram to illustrate a particular embodiment of data storage at a multi-channel multi-port memory device when memory banks are fully shared between memory ports and memory channels.

In a particular embodiment, when memory banks are fully shared, a particular memory bank is used by all memory ports until the particular memory bank is full. When the particular memory bank is full, the memory ports begin to use a different memory bank. For example, in the particular embodiment illustrated in FIG. 3, data packet A 201 and data packet X 205 are received earliest at the multi-port multi-bank structure 200 and stored at the first memory bank 221. Data packet B 202 and data packet Y 206 are received next and stored at the second memory bank 222 because the first memory bank 221 became full after the storage of data packet A 201 and data packet X 205. Similarly, data packet C 203 and data packet Z 207 may be stored at the third memory bank 223 due to the filling up of the second memory bank 222 and the data packet D 204 may be stored at the fourth memory bank 224 due to the filling up of the third memory bank 223.

It will be appreciated that fully sharing memory banks, as illustrated in FIG. 3, may enable more efficient usage of memory space by reducing the chances of a memory controller encountering a memory bank conflict, as fully sharing memory banks may provide the memory controller with a greater number of available memory banks.

Figure 4:
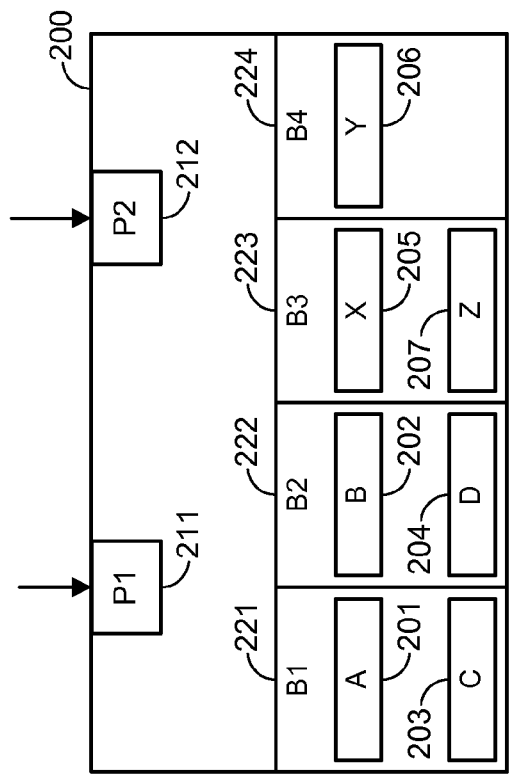
FIG. 4 is a diagram to illustrate a particular embodiment of data storage at a multi-channel multi-port memory device when memory banks are evenly allocated across ports.

FIG. 4 is a diagram to illustrate a particular embodiment of data storage at a multi-channel multi-port memory device when memory banks are evenly allocated across memory ports and memory channels.

In the particular embodiment illustrated in FIG. 4, the memory banks 221-222 are allocated to the first memory port 211 and the memory banks 223-224 are allocated to the second memory port 212. Data packets received at the memory ports 211-212 may be stored in allocated memory banks in the order that the data packets are received. For example, data packets A-B 201-202 may be stored via the first memory port 211 in the first memory bank 221 and data packets C-D 203-204 may be stored via the first memory port 211 in the second memory bank 222. Similarly, data packets X-Y 205-206 may be stored via the second memory port 212 in the third memory bank 223, and data packet Z 207 may be stored via the second memory port 212 in the fourth memory bank 224.

It will be appreciated that evenly allocating memory banks amongst memory ports and memory channels, as illustrated in FIG. 4, may help achieve favorable load balancing.

Figure 5:
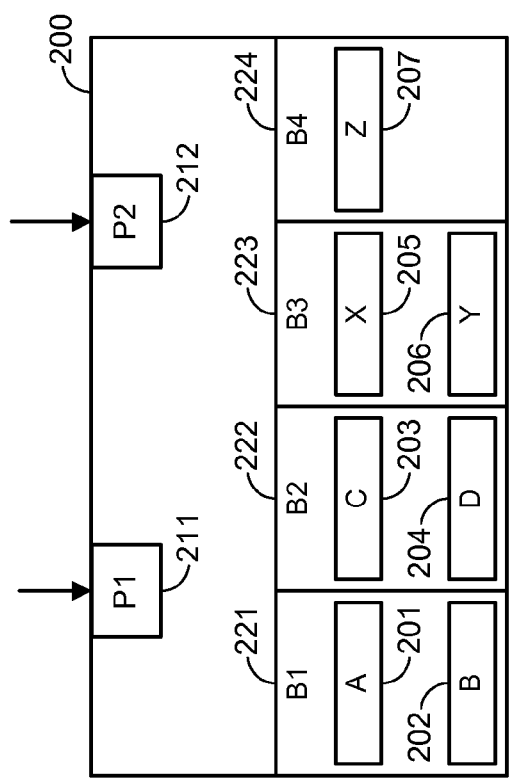
FIG. 5 is a diagram to illustrate a particular embodiment of interleaved data storage at a multi-channel multi-port memory device when memory banks are evenly allocated across ports.

FIG. 5 is a diagram to illustrate a particular embodiment of interleaved data storage at a multi-channel multi-port memory device when memory banks are evenly allocated across ports.

Interleaving may increase bandwidth by allowing concurrent access to more than one channel to achieve load balancing among available memory channels. Interleaving is typically performed by dividing a memory device into multiple regions. For example, each of the memory banks 221-224 may be considered as a region for the purposes of interleaving. Interleaving in a multi-channel multi-port memory may be achieved by an alternating access to different channels of the multi-channel multi-port memory, resulting in favorable load balancing. The success of traditional interleaving may depend on access patterns and interleave size. As described herein, the use of alternate access for interleaving may achieve favorable load balancing independent of access patterns and interleave size.

In FIG. 5, data packets may be stored at the multi-port multi-bank structure 200 in an interleaved fashion. That is, since each of the memory ports 211-212 is allocated two memory banks, data packets received by the memory ports 211-212 may be stored in the two allocated memory banks in an alternating process. With respect to data packets received at the first memory port 211, data packet A 201 may be received first and stored in the first memory bank 221, followed by data packet B 202 that is stored in the second memory bank 222, followed by data packet C 203 that is stored in the first memory bank 221, followed by data packet D 205 that is stored in the second memory bank 222. With respect to data packets received at the second memory port 212, data packet X 205 may be received first and stored in the third memory bank 223, followed by data packet Y 206 that is stored in the fourth memory bank 224, followed by data packet Z 207 that is stored in the third memory bank 223.

It will be appreciated that interleaved data storage, as illustrated in FIG. 5, may improve overall throughput of the multi-port multi-bank structure 200 by allowing more simultaneous accesses to the memory banks 221-224 of the multi-port multi-bank structure 200.

Figure 6:
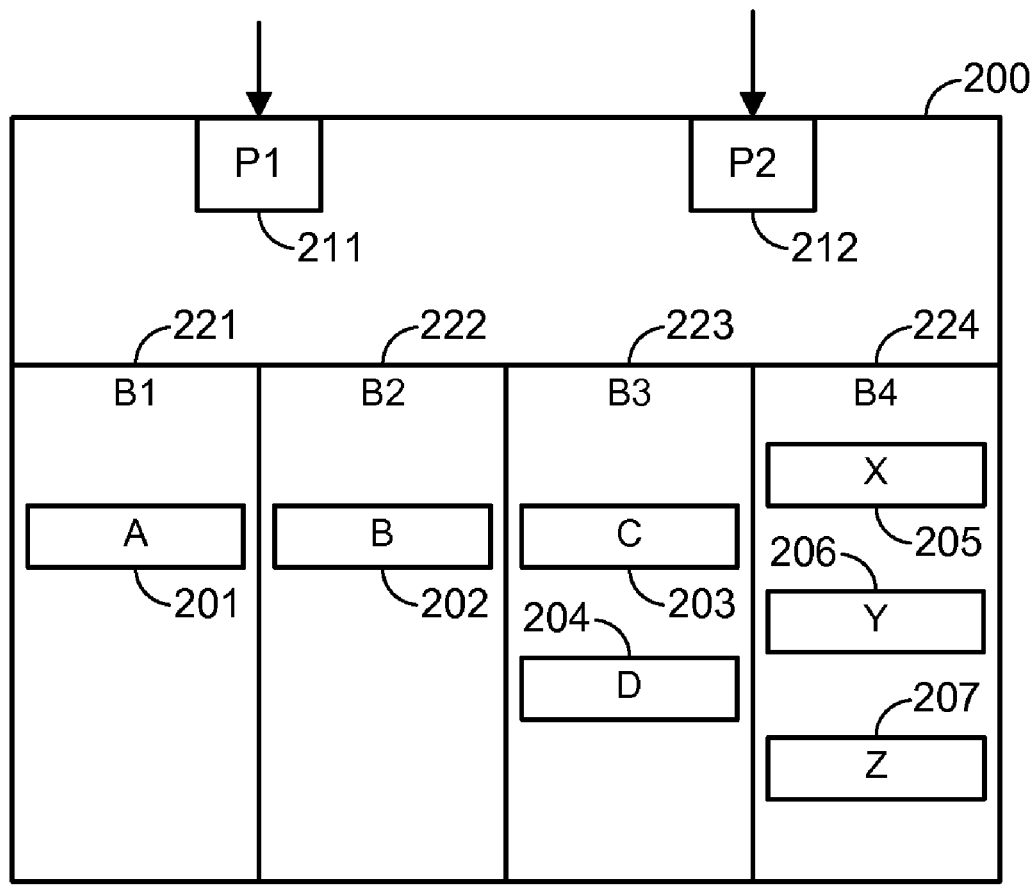
FIG. 6 is a diagram to illustrate a particular embodiment of data storage at a multi-channel multi-port memory device when memory banks are unevenly allocated.

FIG. 6 is a diagram to illustrate a particular embodiment of data storage at a multi-channel multi-port memory device when memory banks are unevenly allocated.

Uneven allocation of memory banks may be advantageous when a particular memory controller accesses memory more often than another memory controller. A particular memory controller may access memory more often due to a particular master (e.g., one of the masters 101-106 of FIG. 1) performing more memory-intensive operations than other masters (e.g., another one of the masters 101-106 of FIG. 1).

For example, the memory controller coupled to the first memory port 211 may perform more memory accesses than the memory controller coupled to the second memory port 212. Consequently, it may be desirable to allocate the memory banks such that a first subset of memory banks allocated to the first memory port 212 has a greater number of memory banks than a second subset of memory banks allocated to the second memory port 212. For example, the memory banks 221-224 may be unevenly allocated such that the first memory port 211 is allocated to three memory banks 221-223 whereas the second memory port 212 is allocated to only one memory bank 224. Thus, data packets received at the first memory port 211 may be stored in any of the three memory banks 221-223, and data packets received at the second memory port 212 may be stored at the fourth memory bank 224. For example, with respect to data packets received at the first memory port 211, data packet A may be stored at the first memory bank 221, data packet B 202 may be stored at the second memory bank 222, and data packets C-D 203-204 may be stored at the third memory bank 223. With respect to data packets received at the second memory port 212, each of the data packets X-Z 205-207 may be stored at the fourth memory bank 224.

It will thus be appreciated that the multi-channel multi-port memory may support both even allocation as well as uneven allocation of memory banks.

In a particular embodiment, the multi-port multi-bank structure 200 may be configured to dynamically change from a first data storage method, such as a first of the allocation methods illustrated in FIGS. 3-6, to a second data storage method, such as a second of the allocation methods illustrated in FIGS. 3-6. Thus, a memory system including a plurality of multi-port multi-bank structures, such as the multi-port multi-bank structures 180, 190 of FIG. 1 or the multi-port multi-bank structures 200 of FIG. 2 may be dynamically reconfigured based on memory usage scenarios and demand profiles to achieve a particular level of throughput, efficiency, and load balancing.

Figure 7:
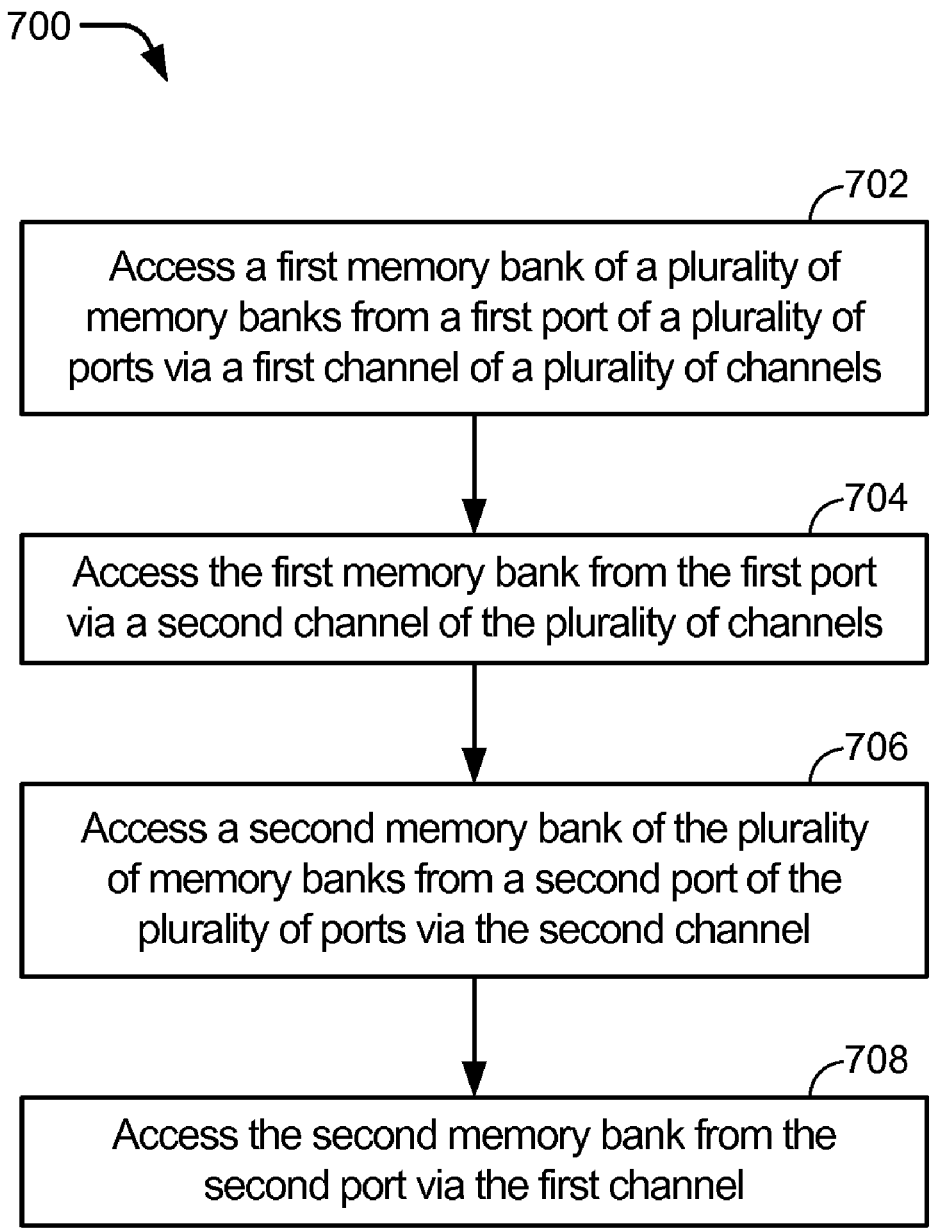
FIG. 7 is a flow chart of a particular embodiment of a method of multi-channel multi-port memory access.

FIG. 7 is a flow chart of a particular embodiment of a method 700 of multi-channel multi-port memory access. In an illustrative embodiment, the method 700 may be performed by the memory access system 100 of FIG. 1.

The method 700 includes accessing a first memory bank of a plurality of memory banks from a first port of a plurality of ports via a first channel of a plurality of channels, at 702. For example, in FIG. 1, the first memory bank 161 may be accessed from the first memory port 141 via a memory channel corresponding to the first memory controller 131.

The method 700 also includes accessing the first memory bank from the first port via a second channel of the plurality of channels, at 704. For example, in FIG. 1, the first memory bank 161 may be accessed from the first memory port 141 via a memory channel corresponding to the second memory controller 132.

The method 700 further includes accessing a second memory bank of the plurality of memory banks from a second port of the plurality of ports via the second channel, at 706. For example, in FIG. 1, the second memory bank 162 may be accessed from the second port 142 via a memory channel corresponding to the second memory controller 132.

The method includes accessing the second memory bank from the second port via the first channel, at 708. For example, in FIG. 1, the second memory bank 162 may be accessed from the second port 142 via a memory channel corresponding to the first memory controller 131.

Figure 8:
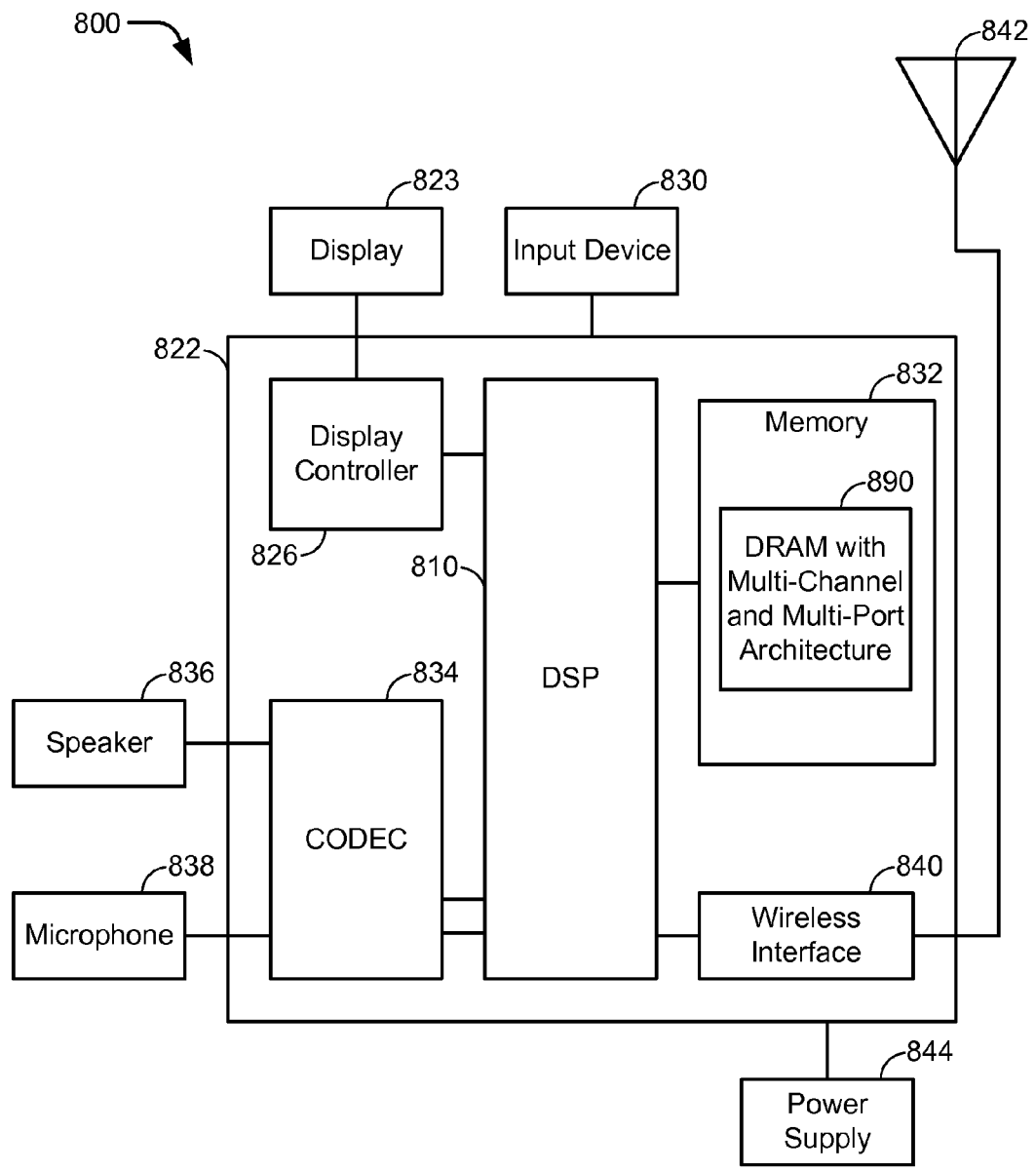
FIG. 8 is a block diagram of a wireless device including a multi-channel multi-port dynamic random access memory (DRAM)

FIG. 8 is a block diagram of a wireless device 800 including a multi-channel multi-port dynamic random access memory (DRAM).

The wireless device 800 includes a processor, such as a digital signal processor (DSP) 810, coupled to a memory 832. The memory includes a DRAM having a multi-channel and multi-port architecture 890. In an illustrative embodiment, the DRAM 890 is the multi-channel multi-port memory 110 of FIG. 1. FIG. 8 also shows an optional display controller 826 that is coupled to the digital signal processor 810 and to a display 823. A coder/decoder (CODEC) 834 can also be coupled to the digital signal processor 810. A speaker 836 and a microphone 838 can be coupled to the CODEC 834.

FIG. 8 also indicates that a wireless interface 840 can be coupled to the digital signal processor 810 and to a wireless antenna 842. In a particular embodiment, the DSP 810, the display controller 826, the memory 832, the CODEC 834, and the wireless interface 840 are included in a system-in-package or system-on-chip device 822. In a particular embodiment, an input device 830 and a power supply 844 are coupled to the system-on-chip device 822. Moreover, in a particular embodiment, as illustrated in FIG. 8, the display 823, the input device 830, the speaker 836, the microphone 838, the wireless antenna 842, and the power supply 844 are external to the system-on-chip device 822. However, each can be coupled to a component of the system-on-chip device 822, such as via an interface or a controller. In an illustrative embodiment, the wireless device 800 is a cellular telephone or a personal digital assistant (PDA).

Figure 9:
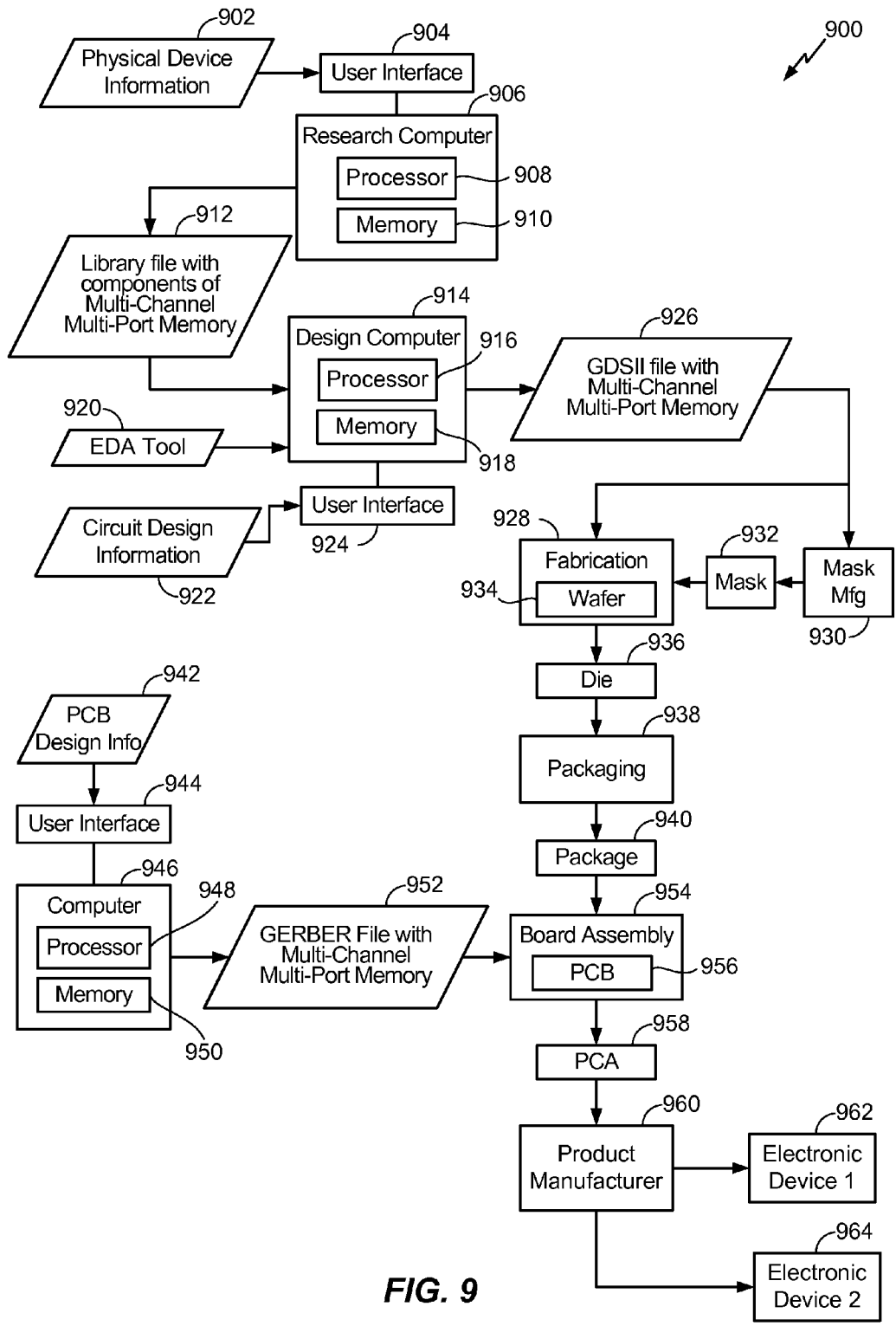
FIG. 9 is a diagram to illustrate a particular embodiment of an electronic device manufacturing process.

The foregoing disclosed devices, functionalities, and associated circuits may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices as described herein. FIG. 9 depicts a particular illustrative embodiment of an electronic device manufacturing process 900.

Physical device information 902 is received in the manufacturing process 900, such as at a research computer 906. The physical device information 902 may include design information representing at least one physical property of a multi-channel multi-port memory. For example, the physical device information 902 may include physical parameters, material characteristics, and structure information that is entered via a user interface 904 coupled to the research computer 906. The research computer 906 includes a processor 908, such as one or more processing cores, coupled to a computer readable medium such as a memory 910. The memory 910 may store computer readable instructions that are executable to cause the processor 908 to transform the physical device information 902 to comply with a file format and to generate a library file 912.

In a particular embodiment, the library file 912 includes at least one data file including the transformed design information. For example, the library file 912 may include a multi-channel multi-port memory (e.g., the multi-channel multi-port memory 110 of FIG. 1) that is provided for use with an electronic design automation (EDA) tool 920.

The library file 912 may be used in conjunction with the EDA tool 920 at a design computer 914 including a processor 916, such as one or more processing cores, coupled to a memory 918. The EDA tool 920 may be stored as processor executable instructions at the memory 918 to enable a user of the design computer 914 to design a circuit including a multi-channel multi-port memory of the library file 912. For example, a user of the design computer 914 may enter circuit design information 922 via a user interface 924 coupled to the design computer 914. The circuit design information 922 may include design information representing at least one physical property of a semiconductor device, such as a multi-channel multi-port memory. To illustrate, the circuit design property may include identification of particular circuits and relationships to other elements in a circuit design, positioning information, feature size information, interconnection information, or other information representing a physical property of a semiconductor device.

The design computer 914 may be configured to transform the design information, including the circuit design information 922 to comply with a file format. To illustrate, the file format may include a database binary file format representing planar geometric shapes, text labels, and other information about a circuit layout in a hierarchical format, such as a Graphic Data System (GDSII) file format. The design computer 914 may be configured to generate a data file including the transformed design information, such as a GDSII file 926 that includes information describing a multi-channel multi-port memory, in addition to other circuits or information.

The GDSII file 926 may be received at a fabrication process 928 to manufacture a multi-channel multi-port memory, according to transformed information in the GDSII file 926. For example, a device manufacture process may include providing the GDSII file 926 to a mask manufacturer 930 to create one or more masks, such as masks to be used for photolithography processing, illustrated as a representative mask 932. The mask 932 may be used during the fabrication process to generate one or more wafers 934 that may be tested and separated into dies, such as a representative die 936. The die 936 includes a multi-channel multi-port memory.

The die 936 may be provided to a packaging process 938 where the die 936 is incorporated into a representative package 940. For example, the package 940 may include the single die 936 or multiple dies, such as a system-in-package (SiP) arrangement. The package 940 may be configured to conform to one or more standards or specifications, such as Joint Electron Device Engineering Council (JEDEC) standards.

Information regarding the package 940 may be distributed to various product designers, such as via a component library stored at a computer 946. The computer 946 may include a processor 948, such as one or more processing cores, coupled to a memory 950. A printed circuit board (PCB) tool may be stored as processor executable instructions at the memory 950 to process PCB design information 942 received from a user of the computer 946 via a user interface 944. The PCB design information 942 may include physical positioning information of a packaged semiconductor device on a circuit board, the packaged semiconductor device corresponding to the package 940 including the multi-channel multi-port memory.

The computer 946 may be configured to transform the PCB design information 942 to generate a data file, such as a GERBER file 952 with data that includes physical positioning information of a packaged semiconductor device on a circuit board, as well as layout of electrical connections such as traces and vias, where the packaged semiconductor device corresponds to the package 940 including the device components to be used in the multi-channel multi-port memory. In other embodiments, the data file generated by the transformed PCB design information may have a format other than a GERBER format.

The GERBER file 952 may be received at a board assembly process 954 and used to create PCBs, such as a representative PCB 956, manufactured in accordance with the design information stored within the GERBER file 952. For example, the GERBER file 952 may be uploaded to one or more machines for performing various steps of a PCB production process. The PCB 956 may be populated with electronic components including the package 940 to form a printed circuit assembly (PCA) 958.

The PCA 958 may be received at a product manufacture process 960 and integrated into one or more electronic devices, such as a first representative electronic device 962 and a second representative electronic device 964. As an illustrative, non-limiting example, the first representative electronic device 962, the second representative electronic device 964, or both, may be selected from the group of a set top box, a music player, a video player, an entertainment unit, a navigation device, a communications device, a personal digital assistant (PDA), a fixed location data unit, and a computer. As another illustrative, non-limiting example, one or more of the electronic devices 962 and 964 may be remote units such as mobile phones, hand-held personal communication systems (PCS) units, portable data units such as personal data assistants, global positioning system (GPS) enabled devices, navigation devices, fixed location data units such as meter reading equipment, any other device that stores or retrieves data or computer instructions, or any combination thereof. Although one or more of FIGS. 1-9 may illustrate particular devices according to the teachings of the disclosure, the disclosure is not limited to these exemplary devices. Embodiments of the disclosure may be suitably employed in any device that includes active integrated circuitry including memory.

One or more aspects of the embodiments disclosed with respect to FIGS. 1-8 may be included at various processing stages, such as within the library file 912, the GDSII file 926, and the GERBER file 952, as well as stored at the memory 910 of the research computer 906, the memory 918 of the design computer 914, the memory 950 of the computer 946, the memory of one or more other computers or processors (not shown) used at the various stages, such as at the board assembly process 954, and also incorporated into one or more other physical embodiments such as the mask 932, the die 936, the package 940, the PCA 958, other products such as prototype circuits or devices (not shown), or any combination thereof. Although various representative stages of production from a physical device design to a final product are depicted, in other embodiments fewer stages may be used or additional stages may be included. Similarly, the process 900 may be performed by a single entity, or by one or more entities performing various stages of the process 900.

Those of skill would further appreciate that the various illustrative logical blocks, configurations, modules, circuits, and method steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
  a plurality of channels responsive to a plurality of memory controllers;
  a first multi-port multi-bank structure accessible to a first set of the plurality of channels, the first multi-port multi-bank structure comprising a first plurality of memory banks, wherein the first multi-port multi-bank structure further comprises two or more ports, wherein the first plurality of memory banks is allocated between the two or more ports and wherein a first subset of the first plurality of memory banks is accessible to a first port of the two or more ports and a second subset of the first plurality of memory banks is accessible to a second port of the two or more ports; and
  a second multi-port multi-bank structure accessible to a second set of the plurality of channels.

2. The apparatus of claim 1, wherein the first plurality of memory banks is accessible to each channel of the first set of the plurality of channels.

3. The apparatus of claim 1, wherein each of the two or more ports is responsive to a memory controller and wherein each channel of the first set of the plurality of channels is responsive to each of the two or more ports.

4. The apparatus of claim 3, wherein the memory controller is one of a plurality of memory controllers coupled to a memory interconnect, wherein the memory interconnect comprises:
  a plurality of master connections, wherein each of the master connections is configured to communicate with one of a plurality of masters; and
  a plurality of slave connections, wherein each of the slave connections is configured to exchange data with one or more of the master connections and to communicate with one of the plurality of memory controllers.

5. The apparatus of claim 4, wherein the plurality of masters include one or more of a multiplexing data processor, a video processor, a graphics processor, a standard control processor, a multiplexer-demultiplexer, and a master control processor.

6. The apparatus of claim 1, wherein the first subset of the first plurality of memory banks and the second subset of the first plurality of memory banks are accessible substantially simultaneously.

7. The apparatus of claim 1, wherein the first plurality of memory banks is unevenly allocated between the two or more ports, wherein a first number of memory banks in the first subset of the first plurality of memory banks is less than a second number of memory banks in the second subset of the first plurality of memory banks.

8. The apparatus of claim 1, wherein data received at the first port is stored among two or more banks of the first set of the first plurality of memory banks.

9. The apparatus of claim 8, wherein the data received at the first port is interleaved between the two or more banks of the first set of the first plurality of memory banks.

10. The apparatus of claim 1, wherein at least one of the first multi-port multi-bank structure and the second multi-port multi-bank structure comprises one or more volatile memory devices.

11. The apparatus of claim 10, wherein the one or more volatile memory devices comprise at least one of:
  dynamic random access memory (DRAM); and
  double data rate random access memory (DDRAM).

12. The apparatus of claim 11, wherein the one or more volatile memory devices comprise stacked double data rate random access memory (DDRAM).

13. The apparatus of claim 12, wherein the one or more volatile memory devices comprise Through Silicon Stacking (TSS) stacked double data rate random access memory (TSS Stacked DDRAM).

14. The apparatus of claim 1, wherein at least one of the first multi-port multi-bank structure and the second multi-port multi-bank structure comprises one or more non-volatile memory devices.

15. The apparatus of claim 14, wherein the one or more non-volatile memory devices comprise at least one of:
   magnetic random access memory;
   programmable contact memory;
   flash memory; and
   phase change random access memory.

16. The apparatus of claim 1, wherein the apparatus is incorporated in a semiconductor die that is integrated in at least one semiconductor device.

17. The apparatus of claim 16, further comprising a device selected from the group consisting of a set top box, a music player, a video player, an entertainment unit, a navigation device, a communications device, a personal digital assistant (PDA), a fixed location data unit, and a computer, into which the semiconductor device is integrated.

18. An apparatus comprising:
   a plurality of memory banks;
   a plurality of ports, wherein each of the plurality of ports is configured to exchange data with a memory controller; and
   a plurality of channels wherein each of the plurality of channels is configured to access each of the memory banks and to exchange data with each of the memory banks and each of the plurality of ports, wherein a first plurality of memory banks of the plurality of memory banks is allocated between the plurality of ports, wherein a first subset of the first plurality of memory banks is accessible to a first port of the plurality of ports and a second subset of the first plurality of memory banks is accessible to a second port of the plurality of ports.

19. The apparatus of claim 18, wherein the first subset of the first plurality of memory banks and the second subset of the first plurality of memory banks are accessible substantially simultaneously.

20. The apparatus of claim 18, wherein the first plurality of memory banks is unevenly allocated between the plurality of ports, wherein a first number of memory banks in the first subset of the first plurality of memory banks is less than a second number of memory banks in the second subset of the first plurality of memory banks.

21. The apparatus of claim 18, wherein data received by one of the plurality of ports is stored among two or more of the plurality of memory banks.

22. The apparatus of claim 21, wherein the data is interleaved between the two or more of the plurality of memory banks.

23. The apparatus of claim 18, wherein the memory controller is one of a plurality of memory controllers coupled to a memory interconnect, wherein the memory interconnect comprises:
   a plurality of master connections, wherein each of the master connections is configured to communicate with one of a plurality of masters; and
   a plurality of slave connections, wherein each of the slave connections is configured to exchange data with one or more of the master connections and to communicate with one of the plurality of memory controllers.

24. The apparatus of claim 18, wherein the memory element is incorporated in a semiconductor die that is integrated in at least one semiconductor device.

25. The apparatus of claim 24, further comprising a device selected from the group consisting of a set top box, a music player, a video player, an entertainment unit, a navigation device, a communications device, a personal digital assistant (PDA), a fixed location data unit, and a computer, into which the semiconductor device is integrated.

26. An apparatus comprising:
   a plurality of means for storing a plurality of data bits;
   a plurality of means for exchanging data with a plurality of memory controllers; and
   a plurality of means for accessing, wherein each of the plurality of means for accessing is configured to access each of the plurality of means for storing and for exchanging data and to exchange data between the means for storing and the means for exchanging data, wherein a first plurality of means for storing of the plurality of means for storing is allocated between the plurality of means for exchanging and wherein a first subset of the first plurality of means for storing is accessible to first means for exchanging and a second subset of the first plurality of means for storing is accessible to second means for exchanging.

27. The apparatus of claim 26 integrated into at least one semiconductor die.

28. The apparatus of claim 26, further comprising a device selected from the group consisting of a set top box, a music player, a video player, an entertainment unit, a navigation device, a communications device, a personal digital assistant (PDA), a fixed location data unit, and a computer, into which the plurality of means for exchanging data and the plurality of means for storing are integrated.

29. A method comprising:
   accessing a first memory bank of a plurality of memory banks from a first port of a plurality of ports via a first channel of a plurality of channels;
   accessing the first memory bank from the first port via a second channel of the plurality of channels;
   accessing a second memory bank of the plurality of memory banks from a second port of the plurality of ports via the second channel;
   accessing the second memory bank from the second port via the first channel; and
   allocating the plurality of memory banks among the plurality of ports, wherein a first set of memory banks is allocated to the first port and a second set of memory banks is allocated to the second port.

30. The method of claim 29, wherein the first set of memory banks and the second set of memory banks are accessible substantially simultaneously.

31. The method of claim 30, further comprising unevenly allocating the plurality of memory banks among the plurality of ports, wherein the first set of memory banks comprises a larger number of memory banks than a number of memory banks in the second set of memory banks.

32. The method of claim 29, further comprising interleaving data between of the first memory bank and the second memory bank.

33. A method comprising:
   a first step for accessing a first memory bank of a plurality of memory banks from a first port of a plurality of ports via a first channel of a plurality of channels;
   a second step for accessing the first memory bank from the first port via a second channel of the plurality of channels;
   a third step for accessing a second memory bank of the plurality of memory banks from a second port of the plurality of ports via the second channel;
   a fourth step for accessing the second memory bank from the second port via the first channel; and a fifth step for allocating the plurality of memory banks among the plurality of ports, wherein a first set of memory banks is allocated to the first port and a second set of memory banks is allocated to the second port.

34. The method of claim 33, wherein the first step, the second step, the third step, the fourth step, and the fifth step are performed by a processor integrated into an electronic device.

35. The method of claim 33, further comprising a sixth step for interleaving data between the first memory bank and the second memory bank.

36. A computer-readable tangible medium storing instructions executable by a processor, the instructions comprising:
instructions that are executable by the processor to access a first memory bank of a plurality of memory banks from a first port of a plurality of ports via a first channel of a plurality of channels;
instructions that are executable by the processor to access the first memory bank from the first port via a second channel of the plurality of channels;
instructions that are executable by the processor to access a second memory bank of the plurality of memory banks from a second port of the plurality of ports via the second channel;
instructions that are executable by the processor to access the second memory bank from the second port via the first channel; and
instructions that are executable by the processor to allocate the plurality of memory banks among the plurality of ports, wherein a first set of memory banks is allocated to the first port and a second set of memory banks is allocated to the second port.

37. The computer-readable tangible medium of claim 36, wherein the processor is integrated in a device selected from the group consisting of a set top box, a music player, a video player, an entertainment unit, a navigation device, a communications device, a personal digital assistant (PDA), a fixed location data unit, and a computer.

38. A method comprising:
receiving design information representing at least one physical property of a semiconductor device, the semiconductor device comprising:
a plurality of channels responsive to a plurality of memory controllers;
a first multi-port multi-bank structure accessible to a first set of the plurality of channels, the first multi-port multi-bank structure comprising a first plurality of memory banks, wherein the first multi-port multi-bank structure further comprises two or more ports, wherein the first plurality of memory banks is allocated between the two or more ports, and wherein a first subset of the first plurality of memory banks is accessible to a first port and a second subset of the first plurality of memory banks is accessible to a second port; and
a second multi-port multi-bank structure accessible to a second set of the plurality of channels;
transforming the design information to comply with a file format; and
generating a data file including the transformed design information.

39. The method of claim 38, wherein the data file includes a GDSII format.

40. A method comprising:
receiving a data file comprising design information corresponding to a semiconductor device; and
fabricating the semiconductor device according to the design information, wherein the semiconductor device comprises:
a plurality of channels responsive to a plurality of memory controllers;
a first multi-port multi-bank structure accessible to a first set of the plurality of channels, the first multi-port multi-bank structure comprising a first plurality of memory banks, wherein the first multi-port multi-bank structure further comprises two or more ports, wherein the first plurality of memory banks is allocated between the two or more ports, and wherein a first subset of the first plurality of memory banks is accessible to a first port and a second subset of the first plurality of memory banks is accessible to a second port; and
a second multi-port multi-bank structure accessible to a second set of the plurality of channels.

41. The method of claim 40, wherein the data file has a GDSII format.

42. A method comprising:
receiving design information comprising physical positioning information of a packaged semiconductor device on a circuit board, the packaged semiconductor device comprising:
a plurality of channels responsive to a plurality of memory controllers;
a first multi-port multi-bank structure accessible to a first set of the plurality of channels, the first multi-port multi-bank structure comprising a first plurality of memory banks, wherein the first multi-port multi-bank structure further comprises two or more ports, wherein the first plurality of memory banks is allocated between the two or more ports, and wherein a first subset of the first plurality of memory banks is accessible to a first port and a second subset of the first plurality of memory banks is accessible to a second port; and
a second multi-port multi-bank structure accessible to a second set of the plurality of channels; and
transforming the design information to generate a data file.

43. The method of claim 42, wherein the data file has a GERBER format.

44. A method comprising:
receiving a data file comprising design information comprising physical positioning information of a packaged semiconductor device on a circuit board; and
manufacturing the circuit board configured to receive the packaged semiconductor device according to the design information, wherein the packaged semiconductor device comprises:
a plurality of channels responsive to a plurality of memory controllers;
a first multi-port multi-bank structure accessible to a first set of the plurality of channels, the first multi-port multi-bank structure comprising a first plurality of memory banks, wherein the first multi-port multi-bank structure further comprises two or more ports wherein the first plurality of memory banks is allocated between the two or more ports, and wherein a first subset of the first plurality of memory banks is accessible to a first port and a second subset of the first plurality of memory banks is accessible to a second port; and
a second multi-port multi-bank structure accessible to a second set of the plurality of channels.

45. The method of claim 44, wherein the data file has a GERBER format.

46. The method of claim 44, further comprising integrating the circuit board into a device selected from the group consisting of a set top box, a music player, a video player, an entertainment unit, a navigation device, a communications device, a personal digital assistant (PDA), a fixed location data unit, and a computer.

* * * * *